(12) United States Patent
Takizawa et al.

(10) Patent No.: US 7,493,379 B2
(45) Date of Patent: Feb. 17, 2009

(54) BUSINESS PROCESS MANAGING SYSTEM, SERVER DEVICE, OUTSIDER COOPERATIVE SERVER DEVICE, BUSINESS PROCESS MANAGING METHOD, AND COMPUTER PRODUCT

(75) Inventors: Osamu Takizawa, Kawasaki (JP); Shunichiro Koiso, Kawasaki (JP); Midori Suto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 959 days.

(21) Appl. No.: 09/881,737

(22) Filed: Jun. 18, 2001

(65) Prior Publication Data
US 2002/0107710 A1    Aug. 8, 2002

(30) Foreign Application Priority Data
Feb. 2, 2001    (JP) .............................. 2001-027498

(51) Int. Cl.
*G06F 15/16* (2006.01)
(52) U.S. Cl. ...................... 709/223; 709/203; 709/224; 709/225; 709/226; 705/7; 705/8; 705/9; 707/9; 707/10
(58) Field of Classification Search ................. 709/203, 709/223, 224, 225, 226; 705/7, 8, 9; 707/9, 707/10
See application file for complete search history.

(56) References Cited

U.S. PATENT DOCUMENTS

| 5,799,297 | A | * | 8/1998 | Goodridge et al. ............. 707/1 |
| 6,041,306 | A | * | 3/2000 | Du et al. ........................ 705/8 |
| 6,151,583 | A | * | 11/2000 | Ohmura et al. ................. 705/8 |
| 6,225,998 | B1 | * | 5/2001 | Okita et al. .................. 715/853 |
| 6,526,388 | B1 | | 2/2003 | Sakaguchi et al. |

FOREIGN PATENT DOCUMENTS

| JP | 09-185655 | 7/1997 |
| JP | 10-269293 | 10/1998 |
| JP | 10-320490 | 12/1998 |
| WO | 98/00786 | 1/1998 |

OTHER PUBLICATIONS

Decision of Rejection mailed Feb. 13, 2007 in a corresponding Japanese application No. 2001-027498.
Office Action mailed Aug. 3, 2006 in corresponding Japanese application No. 2001-027498.
US-6,526,388 (reference AA) corresponds to JP-10-320490 (reference AG).

* cited by examiner

Primary Examiner—Jinsong Hu
(74) Attorney, Agent, or Firm—Staas & Halsey LLP

(57) ABSTRACT

The system comprises a technical information exchanging server device that is connected to in-office use client devices in respective departments in a company through a network and an outsider cooperative server device that is connected to agent-use client devices in respective departments outside the company through a network, and these server devices are mutually connected so as to communicate with each other.

20 Claims, 10 Drawing Sheets

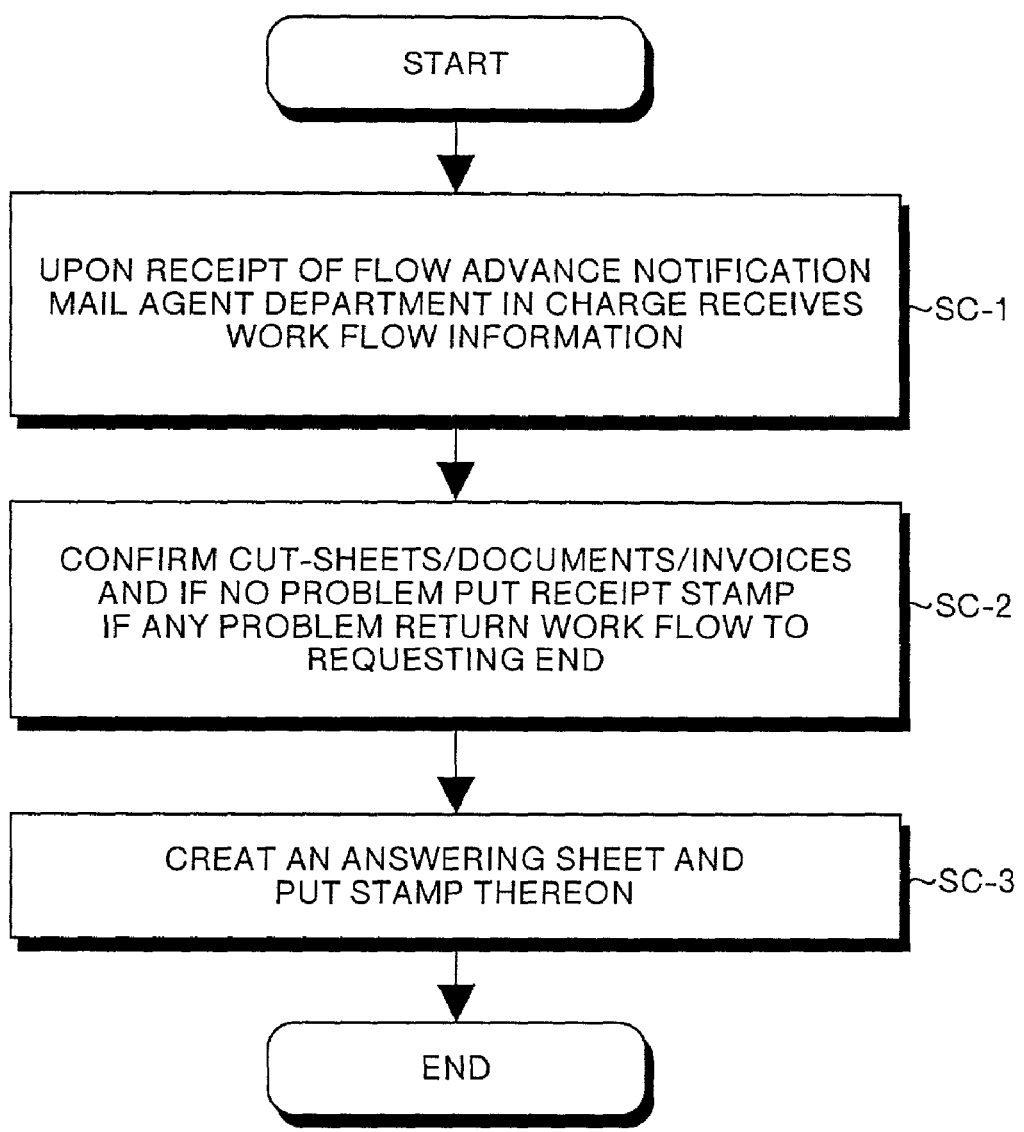

BUSINESS PROCESS MANAGING SYSTEM, SERVER DEVICE, OUTSIDER COOPERATIVE SERVER DEVICE, BUSINESS PROCESS MANAGING METHOD, AND COMPUTER PRODUCT

FIELD OF THE INVENTION

The present invention relates to a business process managing system, a server system, an outsider cooperative server device, a business process managing method, a program for allowing the server device to execute the business process managing method, and a program for allowing the outsider cooperative server device to execute the business process managing method.

BACKGROUND OF THE INVENTION

Conventionally, there have been business-to-business systems, which exchange information of business transactions and settlement processes between companies (B2B) through a network, by using Electronic Data Interchange (EDI), etc. In these conventional company-to-company business systems, on-line connections are made to client companies so that processes, such as ordering and order-receiving processes and settlements, are electronically executed. The EDI includes a business-protocol corresponding a cut-sheet format and a communication protocol for transmitting this protocol, and there are standards in respective business fields; for example, a FBA (Federation of Bankers Association) procedure is used in the monetary field, a JCA procedure is used in the distribution field, and an EIAJ standard is used in the manufacturers.

However, in the conventional company-to-company business systems using the EDI, there is a limitation in the amount of transfer data, and these systems are not suitable for a great amount of data communications. Moreover, there is a basic problem in the system structure in which work flows in respective business processes are not managed between companies in a systematic manner by using an easy method.

The following description will discuss the contents of this problem more specifically.

In the conventional company-to-company business systems, with respect to the exchanging system of technical information in business processes bridging between departments/companies, the EDI is not used because there are usually a great amount of data communications, with the result that the data exchanging is usually carried out on a sheet basis or a medium basis such as FDs and MOs. However, in the case when this is carried out through a plurality of departments, since it is difficult to know which department currently has a delay, it is necessary to make a confirmation by using telephone or facsimile, etc. For this reason, when an ordering company, etc., tries to confirm the current state of a job in the ordered company, etc., the means to be used is telephone, etc.; therefore, the resulting problem is that the confirmation is not made in real time.

Moreover, in the ordered company, etc., of a business process, since it is difficult to know the current stage in the work flow of the entire business process, the company cannot preliminarily confirm when the ordering information arrives, and the corresponding action is made after it has received the ordering information; therefore, the resulting problem is that the business procedure is not shortened. Furthermore, another problem is that since, in some cases, it is not possible to divide the business process into a plurality of jobs from a predetermined job so as to execute these in parallel with each other, some business processes are not handled properly.

Moreover, the ordered company, etc., of a business process needs to log in a main system that manages the work flow in order to confirm the current stage in the work flow of the entire business process. When each ordered company is allowed to refer to the process executing information, etc., all the information related to respective stages of the work flow might be shared by each company, with the result that information might leak to even those departments and companies that should not share the information.

Moreover, in the conventional company-to-company business systems using the EDI, since there is a limitation in the amount of transfer data, and since it is not suitable for a great amount of data transmission, only cut-sheets are electronically transferred, and the corresponding technical information is transferred later in the form of paper or recording media, etc. Therefore, even when the cut-sheets are received in real time, it is necessary to wait for the arrival of the technical information so as to carry out estimating processes, etc., resulting in a lengthened processing time as a whole.

Furthermore, in the conventional company-to-company business systems using the EDI, another problem is that, since a plurality of users (departments) are not allowed to use the system in one company, it is difficult to share data within the client.

In most of tools for generating work flows for the conventional company-to-company business systems using the EDI, high-grade of knowledge is required for forming a template of plans in many cases, and in many business designing processes, many returning of jobs (discarding), skipping of jobs (jumping), etc., occur; however, the conventional tools for generating work flows fail to handle such complex plans. Moreover, in the conventional work flow tools, since it is not possible to set the calendar independently, the setting of the deadline becomes indefinite. Furthermore, in the conventional work flow tools, another problem is that the number of issues of cut-sheets, documents, materials, etc., in association with the flow can not be managed. In the conventional work flow tools, still another problem is that, since cut-sheets, documents, materials, etc., in association with the flow are not compressed within the system, the user needs to compress these independently. Moreover, these work flow tools fail to set the deadline for a job in each stage.

Instead of transmitting technical information in the form of paper or recording medium, etc., electronic mails (E-Mail) may be used; however, in the case of electronic mails, it is not possible to confirm whether or not the information has positively been sent to the transmission end, and the transmission is sometimes difficult since most of the technical information requires a great capacity. Moreover, the transmission of the technical information using electronic mails raises a problem with security.

Moreover, in the conventional company-to-company business systems using the EDI, it is difficult for approvers for respective businesses to refer to information of data, except for data as printed materials, resulting in a problem with maintenance of evidence. Moreover, in the case when the approval stamps, examination stamps and attendant stamps are all effective, if, even when the upper-rank stamps have been finished, any lower-rank stamp has not been finished, the approval process can not be completed, resulting in degradation in the operability.

As described above, there are many problems in the conventional systems, etc., with the result that they are not convenient for any of the system users and managers, and they also fail to provide good business efficiency.

SUMMARY OF THE INVENTION

It is an object of this invention to provide a business process managing system, which can transmit a great amount of data without a limitation in the amount of transfer data, and manage work flows in respective business processes in a systematic manner between companies by using a simple method, as well as a server device, an outsider cooperative server device, a business process managing method and a program for use in such a system.

The business process managing system in accordance with one aspect comprises a server device connected to a plurality of client devices through a network, said client devices being installed at different departments inside a company; and an outsider cooperative server connected to a plurality of client devices through a network, said client devices being installed at different departments outside said company. The server device and outsider cooperative server being connected to each other through a network. The server device comprises a managing number storage unit which stores a managing number corresponding to the business process; a process information storage unit which stores process information for managing a work flow corresponding to the business process having the managing number stored in said managing number storage unit; a technical information storage unit which stores technical information formed in any of stages constituting the work flow; and a transmission unit which transmits the process information stored in said process information storage unit and the technical information stored in said technical information storage unit to said outsider cooperative server device. The outsider cooperative server device comprises a transmission folder storage unit which stores the process information and the technical information received from said server device in a transmission folder for said server device; a receiving folder storage unit which stores the transmission folder stored by the transmission folder storage unit in a receiving folder for each of the client devices of the respective departments outside the company; and an access permission unit which gives a permission to said client devices for the respective departments outside the company to make an access to the receiving folder in accordance with respective conditions.

The business process managing method in accordance with another aspect comprises following steps. That is, storing a managing number corresponding to the business process; storing process information for managing a work flow corresponding to the business process having the stored managing number; storing technical information formed in any of stages constituting the work flow; transmitting the stored process information and technical information to said outsider cooperative server device; storing the process information and the technical information received from said server device in a transmission folder for said server device; storing the transmission folder in a receiving folder for each of the client devices of the respective departments outside the company; and giving a permission to said client devices for the respective departments outside the company to make an access to the receiving folder in accordance with respective conditions.

The program in accordance with still another aspect realizes the business process managing method according to the present invention.

According to the present invention, the server device stores the managing number corresponding to each of the business processes. Therefore, it is possible to totally manage the managing numbers so that billing documents, materials, etc., generated in the business processes are made in association with each other through the managing numbers.

Other objects and features of this invention will become apparent from the following description with reference to the accompanying drawings.

BRIEF DESCRIPTION OF THE DRAWINGS

FIG. 10 is a flow chart that shows one example of a process in each stage in a business process executed by a user of the agent-use client device 250.

DESCRIPTION OF THE PREFERRED EMBODIMENTS

Preferred embodiments of a business process managing system, a server device, an outsider cooperative server device, a business process managing method, a program for allowing the server device to execute the business process managing method and a program for allowing the outsider cooperative server device to execute the business process managing method of the present invention will be explained in detail below. However, the present invention is not intended to be limited by these embodiments.

Figure 1:
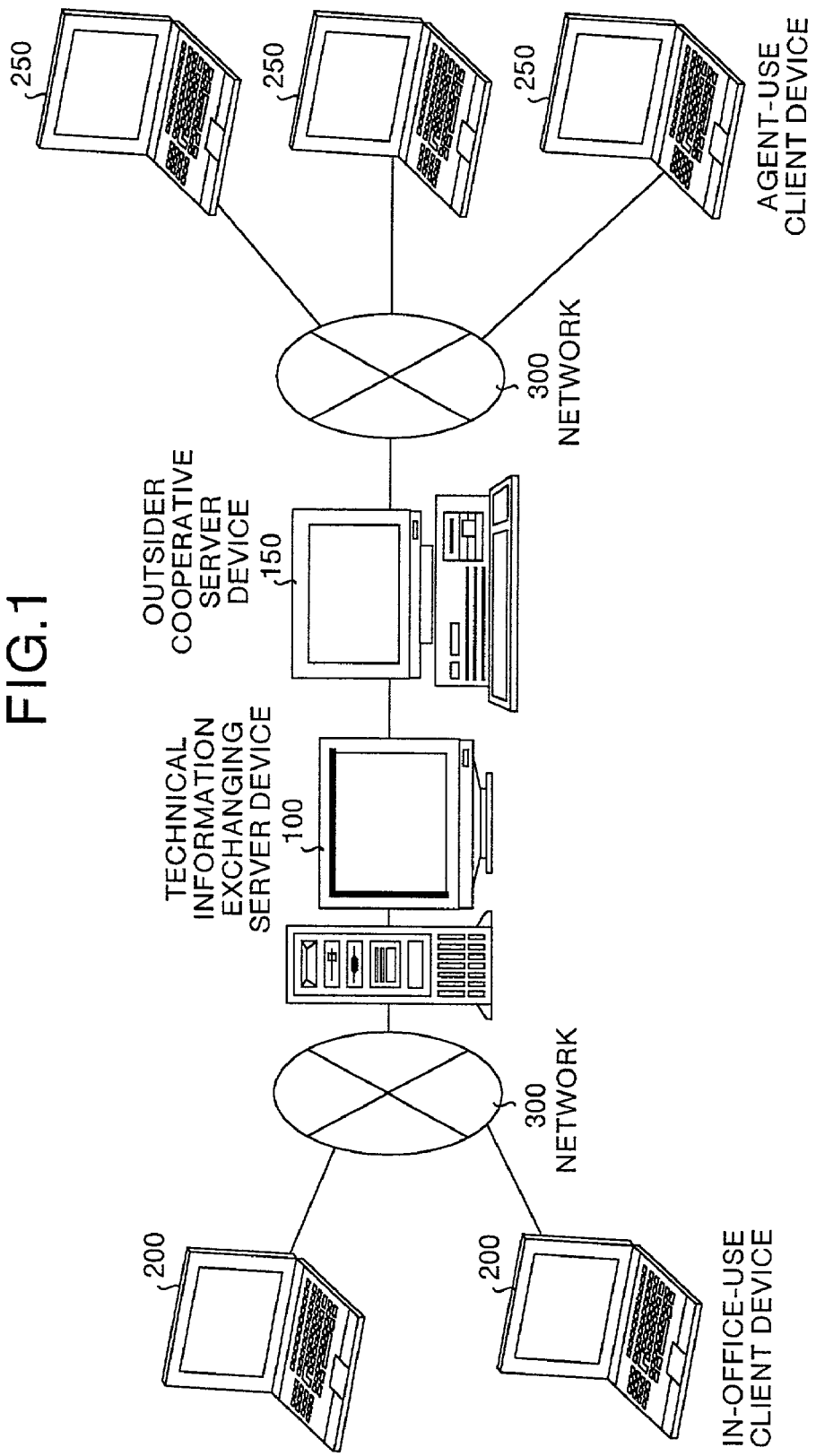
FIG. 1 is a block diagram that shows one example of an entire structure of the present system.

Outline of the present system will be explained first. Also, detailed explanation will be given of the structure and processes, etc., of the present system. FIG. 1 is a block diagram that shows one example of the entire structure of the present system and that also conceptually shows only portions of the system structure related to the present invention.

As illustrated in FIG. 1, the present system is schematically constituted by an interoffice system consisting of the technical information exchanging server device 100, outsider cooperative server device 150, and in-office use client devices 200 connected to the technical information exchanging server device 100 through a network 300 so as to communicate with each other, and outside agent-use client devices 250. In this arrangement, the interoffice system and the outside agent-use client devices 250 are connected to each other so as to communicate with each other through the network 300.

This system is schematically provided with the following basic features. The in-office use client devices 200 are placed in respective departments in a company, and connected to the technical information exchanging server device 100. Moreover, the agent-use client devices 250 are placed in respective departments in a customer company outside the company, and connected to the outsider cooperative server device 150 through the network 300. The outsider cooperative server device 150 is provided with a cooperative function between the inside and outside the company, and, in general, this may be provided as a firewall server. The technical information exchanging server 100 has a function for systematically managing "process information" used for managing a work flow of each business process executed by the in-office use client devices 200 or the agent-use client devices 250 and "technical information" that is formed in each of stages constituting the process.

The work flow of each business process executed by the present system is constituted by one or a plurality of stages.

"Stage" is a unit of business procedures executed by the user of the in-office use client device 200 or the user of the outside agent-use client device 250. In other words, the "business process" is a collection of the business procedures (stages), and, in general, a sequence of business procedures are successively executed so that a predetermined object is achieved.

The user forms "technical information" such as cut-sheets and materials in each of the stages, and the technical information formed at the previous stages is utilized by those users working at the succeeding stages. In other words, the technical information exchanging server device 100 functions in such a manner that the technical information of the respective stages can be shared in the other stages.

Further, a flow that defines the order of execution of the stages is referred to as "work flow".

The "process information", which is information for managing the work flow, includes, for example, the number of stages, user information related to users executing the respective stages (IDs, passwords, etc.), time and date of the deadline of each stage, time and date of the job completion of each stage, information related to technical information such as cut-sheets and documents, formed in each stage, and information related to the current stage number, etc., and is recorded in a process DB in the technical information exchanging server device 100.

An explanation will be given of the structure of the present system for realizing the above-mentioned basic features.

First, an explanation will be given of the structure of the technical information exchanging server device 100. The technical information exchanging server device 100 has functions for executing a master managing process in which the manager of a system is allowed to manage various pieces of information such as master information and a work flow process in which the manager of the system is allowed to manage work flows of respective business processes (each business process will be described later in detail). The technical information exchanging server device 100 is basically constituted by a control unit such as a CPU for systematically controlling the entire technical information exchanging server device 100, a system clock section which is connected to a communication device (not shown) such as a router connected to a communication line, etc., and has a function for generating a system clock for defining the current date and time, and a storage section for storing various data bases, etc. These parts are connected through predetermined communication paths so as to make communications. Moreover, this server device is connected to the network 300 and the outsider cooperative server device 150 so as to communicate with each other, through a communication path, such as a router, and a cable or radio communication line such as a dedicated line.

Various data bases, placed in the storage section, are storage means, such as a fixed disk device, and store various programs, tables, files, data bases, web-page use files, etc., that are used for various processes and for web-site supplies. The storage section of the technical information exchanging server device 100 stores a managing number DB for storing information related to process managing numbers, a template plan DB for managing a template plan for a work flow, a process managing DB for managing a work flow of a process, a stage DB for managing stages constituting the process, a document DB for managing documents formed in each process, a material DB for managing materials formed in each process, a document template file for storing templates of documents, a bulk data file for storing documents and materials formed in each process, etc. Moreover, with respect to other information, the storage section of the technical information exchanging server device 100 stores various Web data and CGI programs, etc., used for supplying Web sites to the in-office use client devices 200.

Moreover, the control unit is provided with control programs such as OS (Operating System), programs for defining various processing sequences, etc., and inner memories for storing predetermined data, and these programs, etc., carry out information processing for executing various processes.

Now an explanation will be given of the structure of the outsider cooperative server device 150. The outsider cooperative server device 150 has functions for safely exchanging information between the interoffice system and the agent-use client devices 250 in a cooperative manner. The outsider cooperative server device 150 is basically constituted by a control unit such as a CPU for systematically controlling the entire outsider cooperative server device 150, a system clock section which is connected to a communication device (not shown) such as a router connected to a communication line, and has a function for generating a system clock for defining the current date and time, and a storage section having folders, etc., used for exchanging information between the inside and the outside of the company. These parts are connected through predetermined communication paths so as to make communications. Moreover, this server device is connected to the network 300 and the technical information exchanging server device 100 so as to communicate with each other, through a communication path, such as a router, and a cable or radio communication line such as a dedicated line.

The folders, which are stored in the storage section of the outsider cooperative server device 150, form storage areas used for transmitting files safely from the transmitting end to the receiving end. The detailed description of these will be given later. Moreover, in the storage section, various databases, which are storage means such as fixed disk devices, store various programs, tables, files, databases, Web-page-use files, etc., used for various processes and for Web-site supplies, in addition to the folders.

Moreover, with respect to other information, the storage section of the outsider cooperative server device 150 stores various Web data, CGI programs, etc., used for supplying Web sites to the agent-use client devices 250.

Moreover, the control unit of the outsider cooperative server device 150 is provided with control programs such as OS (Operating System), programs for defining various processing sequences, etc., and inner memories for storing predetermined data, and these programs, etc., carry out information processing for executing various processes.

Next, an explanation will be given of the in-office use client device 200 and the agent-use client device 250. Each of the in-office use client devices 200 and the agent-use client devices 250 is basically constituted by a control unit, a ROM, a RAM, a HD, an input device, an output device, an input-output control IF, and a communication control IF, and these parts are connected through a bus so as to make data communications with each other.

The control unit of each of the in-office use client device 200 and the agent-use client device 250 is provided with a Web browser and an electronic mailer. The Web browser basically carries out a display controlling (browsing process) operation in which Web data is interpreted and displayed on a monitor, which will be described later. Moreover, the electronic mailer carries out transmitting and receiving processes of electronic mails in accordance with a predetermined communication protocol (for example, SMTP (Simple Mail Transfer Protocol)).

Moreover, with respect to the input device, a keyboard, a mouse, a microphone, etc., may be used. Furthermore, the monitor, which will be described later, realizes a pointing device function in cooperation with the mouse.

With respect to the output device, in addition to the monitor (including, a home-use television), a speaker may be used (in the following description, the monitor is described as the output device).

Furthermore, the communication control IF controls communications between the in-office use client devices 200, as well as the agent-use client devices 250, and the network 300 (or the communication device such as a router). The communication control IF serves as a communication means to the network 300.

Each of the in-office use client devices 200 and the agent-use client devices 250, arranged as described above, is connected to the Internet through a communication device such as a modem, a TA and a router, and a telephone line, or through a dedicated line, and is allowed to access the technical information exchanging server device 100 or the outsider cooperative server device 150 in accordance with a predetermined communication protocol (for example, TCP/IP Internet Protocol).

Next, an explanation will be given of the structure of the network 300. The network, which has a function for mutually connecting the technical information exchanging server device 100 and the in-office use client devices 200, or the outsider cooperative server device 150 and the agent-use client device 250, is, for example, an interoffice LAN, the Intranet or the Internet.

Next, referring to FIG. 2 to FIG. 12, a detailed explanation will be given of one example of the processes of the present system in the present embodiment having the above-mentioned structure.

Figure 2:
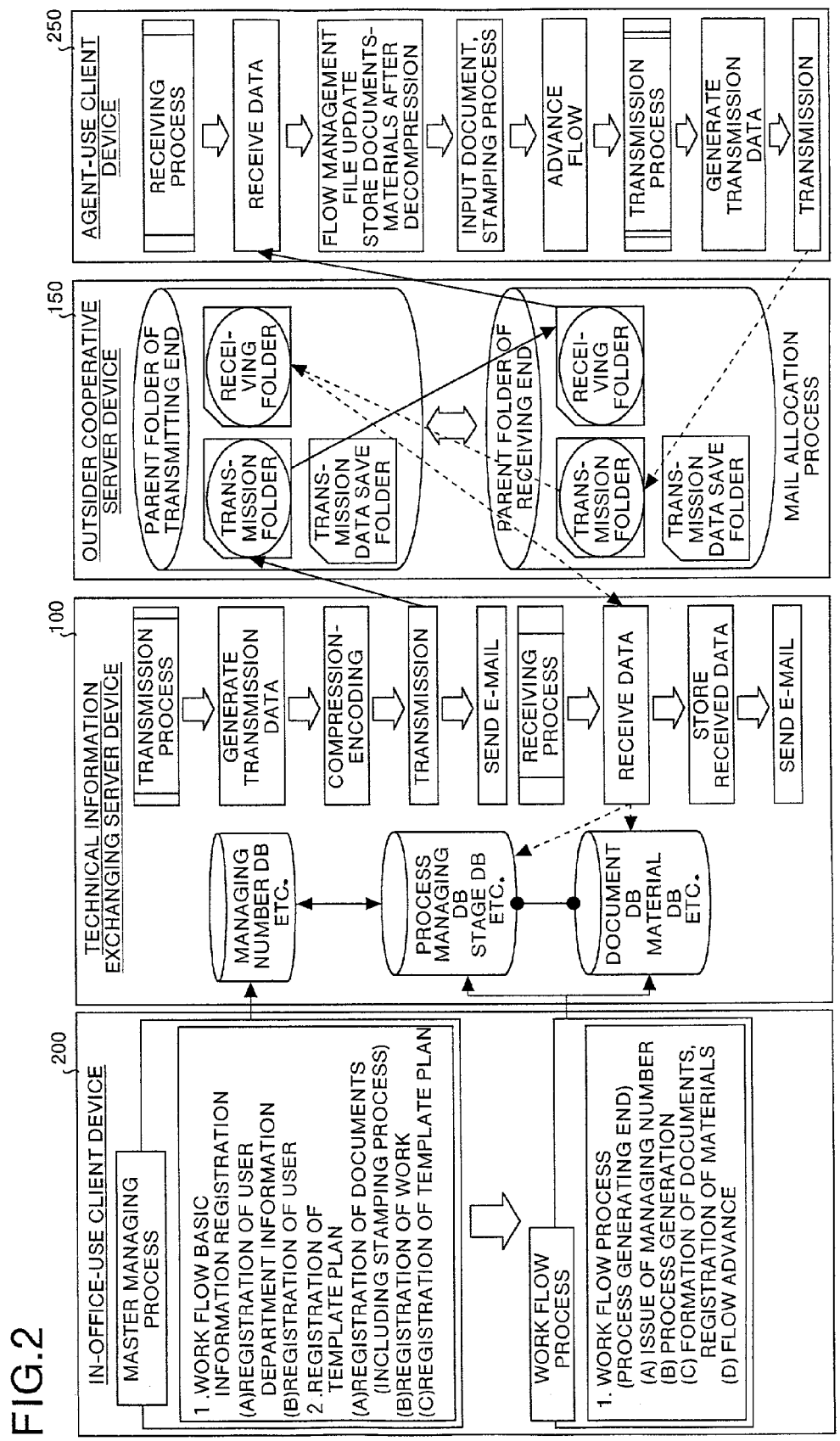
FIG. 2 is a schematic diagram that shows a technical information exchanging process in accordance with the present system.
Figure 7:
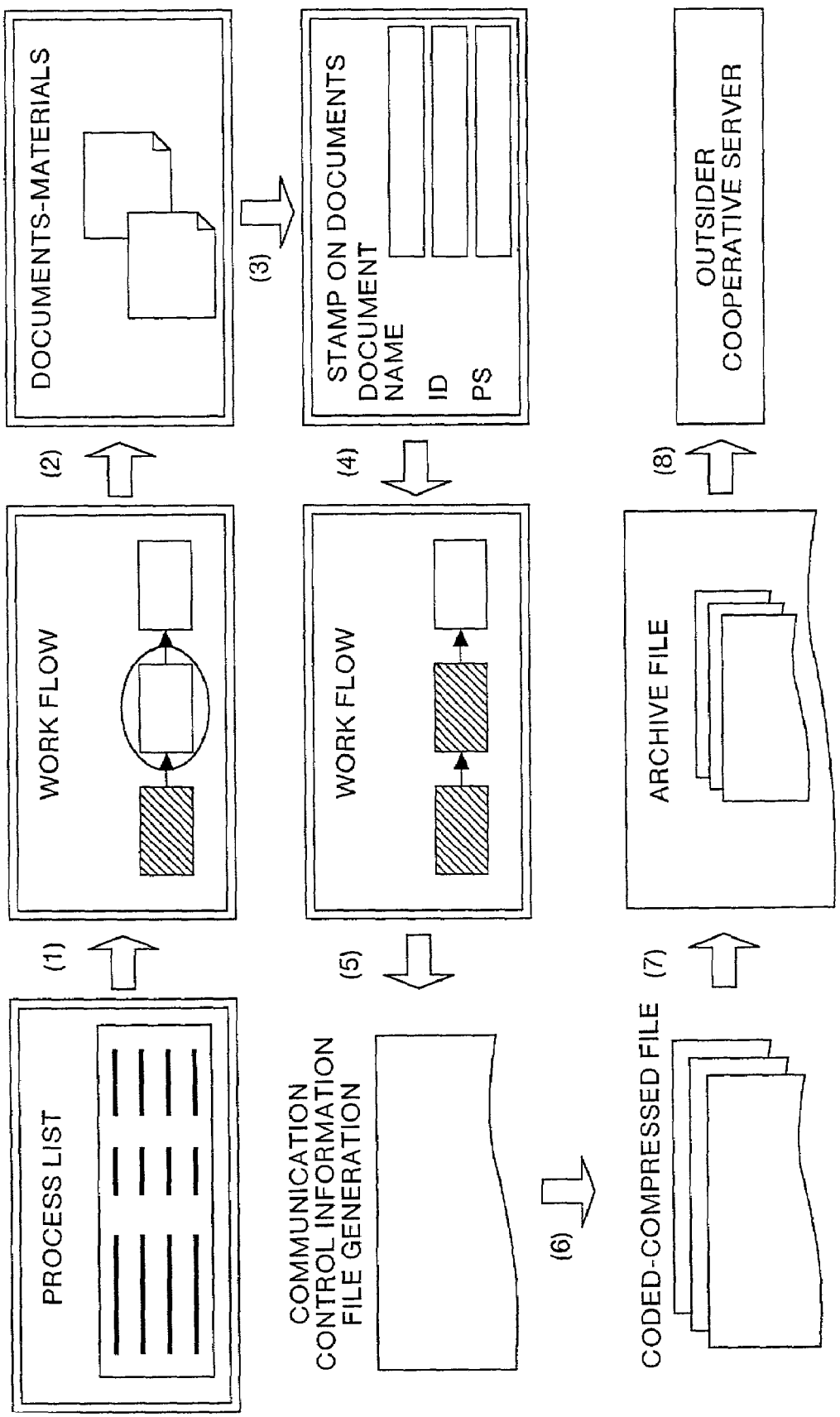
FIG. 7 is a schematic diagram that shows a work flow process of the present system.

Referring to FIGS. 2 and 7, the following description will discuss a technical information exchanging process in the present method carried out by using the present system having the above-mentioned arrangement. FIG. 2 is a schematic diagram that shows the technical information exchanging process of the present system.

First, when the user specifies an address (URL, etc.) of a Web site supplied by a technical information exchanging server device 100 on a screen of browser software, etc., through an input device, etc., an in-office use client device 200 is connected to the technical information exchanging server device 100 through the network 300. With respect to connection methods to Web sites, etc., and browsing methods, etc., thereof, conventional methods may be used; therefore, the description thereof is omitted.

Thus, the in-office use client device 200 is allowed to connect to the technical information exchanging server device 100, and registers basic information of a work flow (that is, registers the user department information related to the user department to which the user of the in-office use client device 200 or the agent-use client device 250 belongs, and the user information), and also registers setting contents related to stages used in the work flow of a template business process and technical information (documents, materials, etc.) to be formed, in accordance with the master managing processes.

Next, the user of the in-office use client device 200, who executes the business process, carries out a work flow process. FIG. 7 is a diagram that schematically shows the work flow process of the present system. First, when the user selects a process to be executed from a process list screen displayed on the monitor of the in-office use client device 200, a work flow screen displaying the work flow corresponding to the process is displayed on the monitor of the in-office use client device 200 ((1) in FIG. 7). Those stages which have already been completed are indicated in black, and those stages which have not been completed are indicated in white. Moreover, those stages that are in charge of the department to which the user belongs are displayed in a state surrounded by an ellipse.

Next, when the user of the in-office use client device 200 selects a stage (stages surrounded by the ellipse) to be processed from the work flow screen, templates of documents, etc., to be formed are sent from the technical information exchanging server device 100. Based upon the templates, the user forms technical information such as documents and materials ((2) in FIG. 7).

Successively, when the user of the in-office use client device 200 has finished forming documents, etc., a document stamping screen is displayed on the monitor of the in-office use client device 200 ((3) in FIG. 7). When the user electrically puts a stamp, etc., on this, the resulting information is transmitted to the technical information exchanging server device 100.

Upon completion of the process of the stage, the technical information exchanging server device 100 registers the job completion date, etc., on the process managing DB, thereby advancing the work flow ((4) in FIG. 7).

Next, with respect to the succeeding stages, if there is any stage that is executed by a department to which a user of any outside agent-use client device 250 belongs, the technical information exchanging server device 100 forms a communication control information file from the information stored in the process information file ((5) in FIG. 7). Moreover, technical information such as documents and materials is compressed, and encoded ((6) in FIG. 7).

Then, the technical information exchanging server device 100 archives the communication control information file and files of the technical information that has been compressed and encoded, into one file ((7) in FIG. 7).

Thus, it transmits this archive file to the outsider cooperative server device 150 ((8) in FIG. 7).

Now returning again to FIG. 2, the technical information exchanging server device 100 transmits an electronic mail to the agent-use client device 250 so as to inform it of the transmission of the file.

The outsider cooperative server device 150 stores the archive file received from the technical information exchanging server device 100 in a transmission folder that is dependent on a parent folder of the transmitting end.

Next, the outsider cooperative server device 150 copies the archive file stored in the transmission folder into a receiving folder that is dependent on the parent folder of the transmitting end.

When, upon receipt of the electronic mail from the technical information exchanging server device 100, the agent-use client device 250 recognizes that any information related to a stage of which its own department is in charge has been stored in the receiving folder, it accesses the receiving folder of the outsider cooperative server device 150 by using a password and obtains the archive file.

The agent-use client device 250 decompresses the archive file, and stores this, and forms documents, cut-sheets, etc., and then carries out a stamping process.

Next, after advancing the work flow, the agent-use client device 250 forms an archive file using the above-mentioned method, and transmits this to the outsider cooperative server device 150.

The outsider cooperative server device 150 stores the archive file thus received in a transmission folder that is dependent on the parent folder of the transmitting end.

The outsider cooperative server device 150 copies the archive file thus stored into a receiving folder that is dependent on the parent folder of the transmitting end.

The technical information exchanging server device 100 obtains the archive file stored in the receiving folder that is dependent on the parent folder of the transmitting end of the outsider cooperative server device 150, and stores this. Thus, the technical information exchanging process is completed.

(Work flow Process of the In-Office Use Client Device 200).

Figure 3:
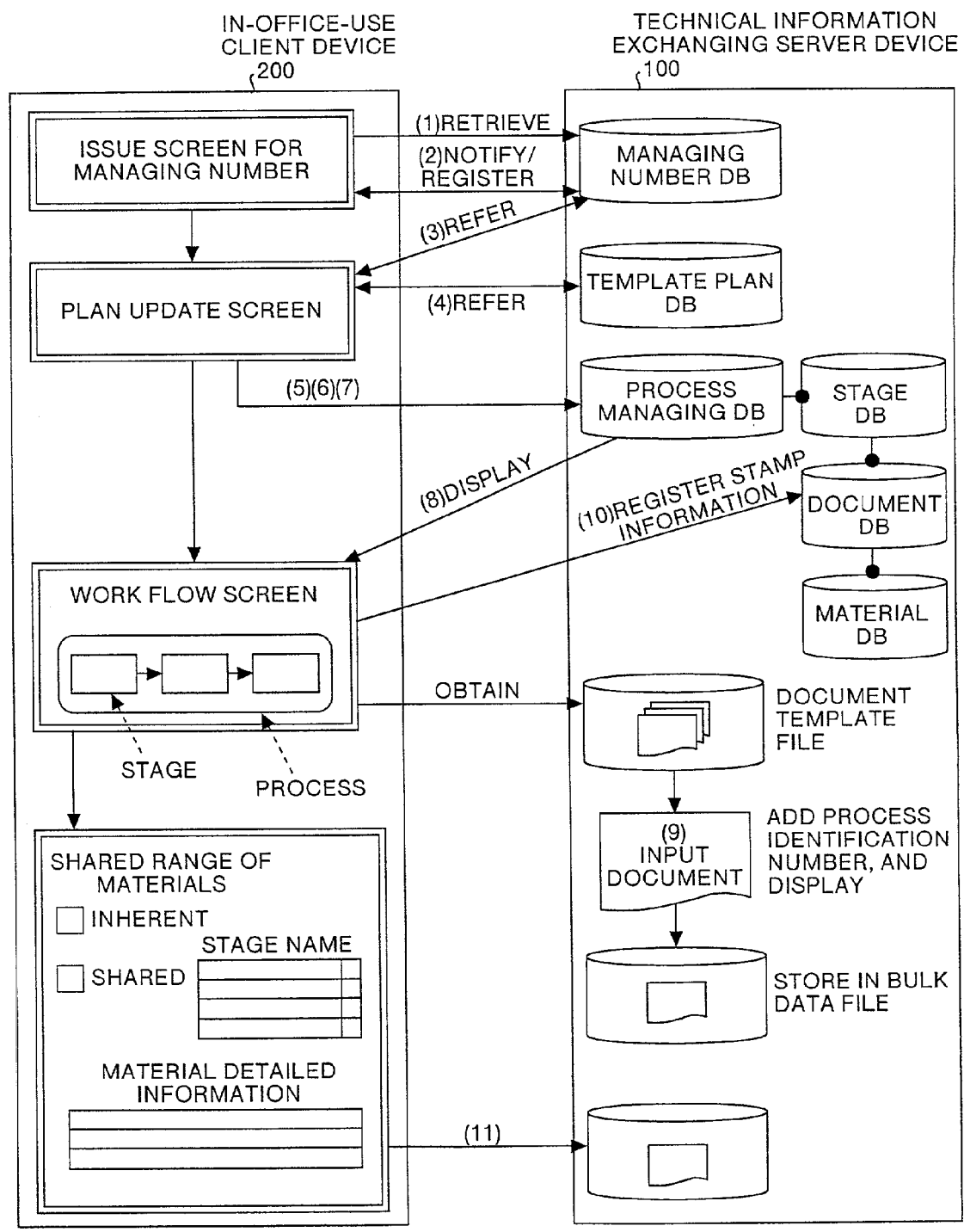
FIG. 3 is a schematic diagram that shows one example of a work flow process of an in-office use client device 200 of the present system in accordance with the present embodiment.
Figure 8:
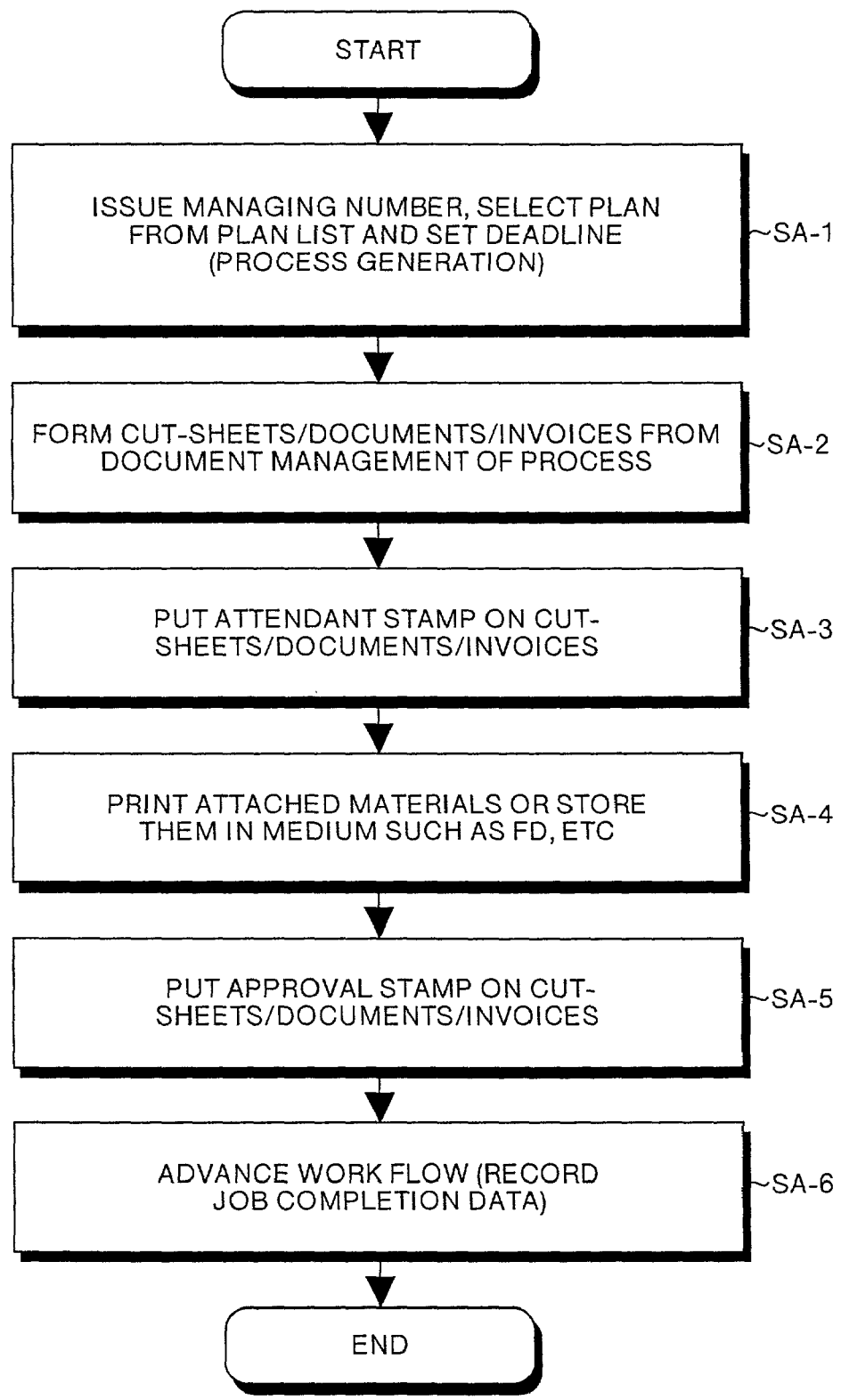
FIG. 8 is a flow chart that shows one example of a work flow process of the in-office use client device 200 of the present system in accordance with the present embodiment.
Figure 9:
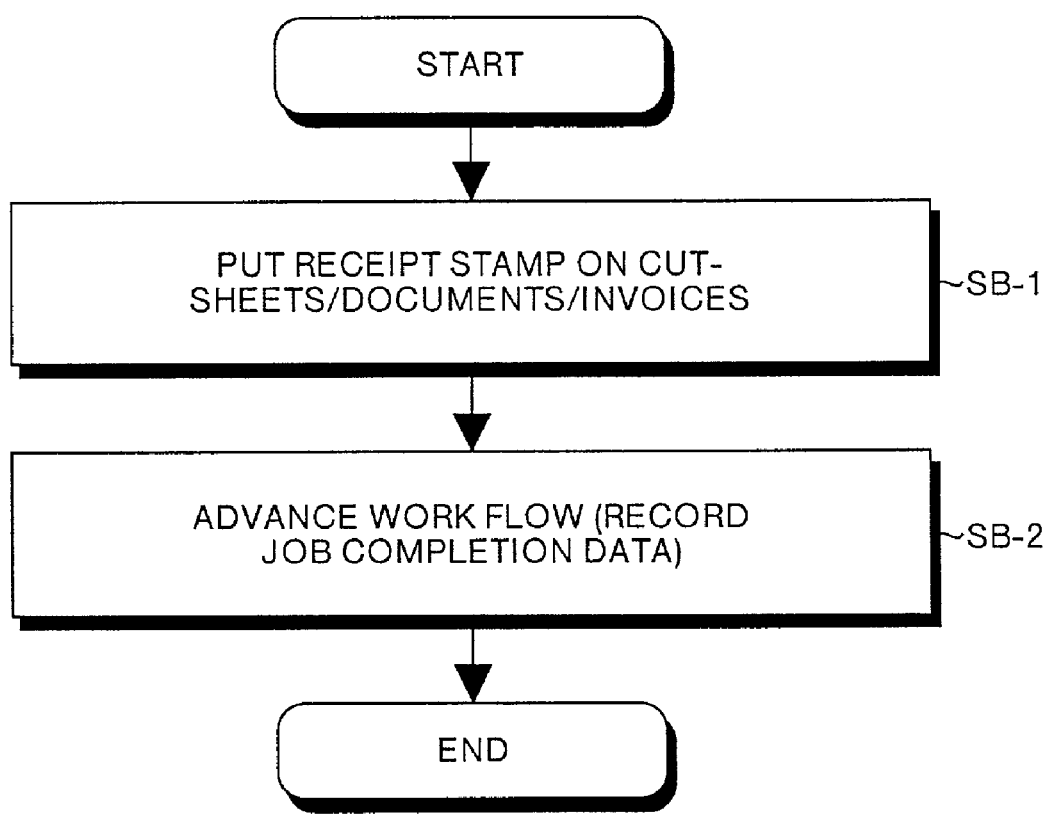
FIG. 9 is a flow chart that shows one example of a process in each stage in a business process executed by a user of the outside cooperative server device 150.

Referring to FIGS. 3, 8 and 9, a detailed explanation will be given of the work flow process of the above-mentioned in-office use client device 200. FIG. 3 is a schematic diagram that shows one example of the work flow process in the in-office use client device 200 of the present system in accordance with the present embodiment, and FIG. 8 is a flow chart that shows one example of the work flow process in the in-office use client device 200 of the present system in accordance with the present embodiment.

First, while viewing the issue screen of the process managing numbers displayed on the monitor of an in-office use client device 200, the user of the in-office use client device 200 retrieves the managing number DB so as to check to see whether or not a desired managing number has been already registered, in order to specify the managing number of a process ((1) in FIG. 3).

When the corresponding managing number has already been registered in the managing number DB, the user notifies this fact, and in the case when it has not been registered, carries out a registering process ((2) in FIG. 3).

Next, while viewing the plan updating screen of the process displayed on the monitor of the in-office use client device 200, the user of the in-office use client device 200 selects the formation of a new process plan with respect to the assigned managing number; thus, the technical information exchanging server device 100 refers to the managing number DB so as to check to see whether or not the managing number has been registered ((3) in FIG. 3).

The technical information exchanging server device 100 accesses the template plan DB storing templates of work flows of the process, and transmits the corresponding template to the in-office use client device 200 ((4) in FIG. 3).

Next, while viewing the template plan of the process displayed on the monitor of the in-office use client device 200, the user of the in-office use client device 200 checks the work flow. In other words, in the template work flow, if there is any stage to be eliminated, or any stage to be added, or if there is any addition or elimination to or from documents and materials to be used, the user carries out a customizing operation, and then stores the resulting information in the process managing DB, the stage DB, the document DB, and the material DB ((5) in FIG. 3).

Moreover, the user of the in-office use client device 200 sets the deadline for each of the stages with respect to the work flow of the process thus formed, and registers this in the process managing DB ((6) in FIG. 3).

Then, the user of the in-office use client device 200 confirms the contents of the registration on the monitor, and if the contents of the registration are correct, makes a determination on the contents of the registration ((7) in FIG. 3, step SA-1).

Next, referring to the process managing DB, the technical information exchanging server device 100 generates a work flow screen to be displayed on the monitor of the in-office use client device 200 of the user, and transmits this to the in-office use client device 200. Thus, the work flow screen is displayed on the monitor of the in-office use client device 200 ((8) in FIG. 3).

While viewing the work flow screen displayed on the monitor of the in-office use client device 200, the user of the in-office use client device 200 executes the stage of which the user is in charge; thus, the technical information exchanging server device 100 accesses the document DB to extract documents to be used in the corresponding stage, and transmits templates of the documents to the in-office use client device 200.

Based upon the templates of the documents thus received, the user of the in-office use client device 200 forms documents ((9) in FIG. 3, step SA-2).

Then, the user of the in-office use client device 200 electronically puts a stamp on the documents thus formed, with the result that the stamp information is transmitted to the technical information exchanging server device 100. The technical information exchanging server device 100 registers the received stamp information in the document DB ((10) in FIG. 3, step SA-3).

Next, the user of the in-office use client device 200 forms materials such as technical information. In this case, these materials are classified into those materials inherent to the present stage and are not used in the other stages and those that are shared with the other stages, and the classified materials are respectively managed. For example, as illustrated in FIG. 3, in a material forming screen, in the case of an inherent material, a mouse click is made on the "inherent" check box, while in the case of a shared material, a mouse click is made on the "shared" check box, and the names of sharing stages are inputted.

The materials thus formed are transmitted to the technical information exchanging server device 100 so as to be stored in the bulk data file or respective storing ends, such as recording media like paper, FDs, etc. ((11) in FIG. 3, step SA-4).

Upon completion of the formation of all the technical information, approval stamps are electronically added to the cut-sheets, documents, invoices, etc. (step SA-5), and these are then transmitted to the technical information exchanging server device 100. The technical information exchanging server device 100 stores the date of completion of the job in the process managing DB, and advances the work flow (step SA-6). Thus, the work flow process in the in-office use client device 200 has been completed.

Next, referring to a flow chart of FIG. 9, an explanation will be given of one example of a process in which the next stage is executed by the user inside the company of the in-office use client device 200.

As described by reference to FIG. 3, the user of the in-office use client device 200 forms documents, cut-sheets and materials to be formed in the stage the user is in charge of, electrically puts a stamp on each of these, and then transmits these to the technical information exchanging server 100 (step SB-1).

The technical information exchanging server device 100 stores the received information in the corresponding data bases and files respectively, accesses the process managing DB to record the date of completion of the job, and then advances the work flow (step SB-2).

Next, referring to FIG. 4 to FIG. 6, and FIG. 10, a detailed explanation will be given of a case in which the next stage of the business process is executed by the user of the outside agent-use client device 250.

Figure 4:
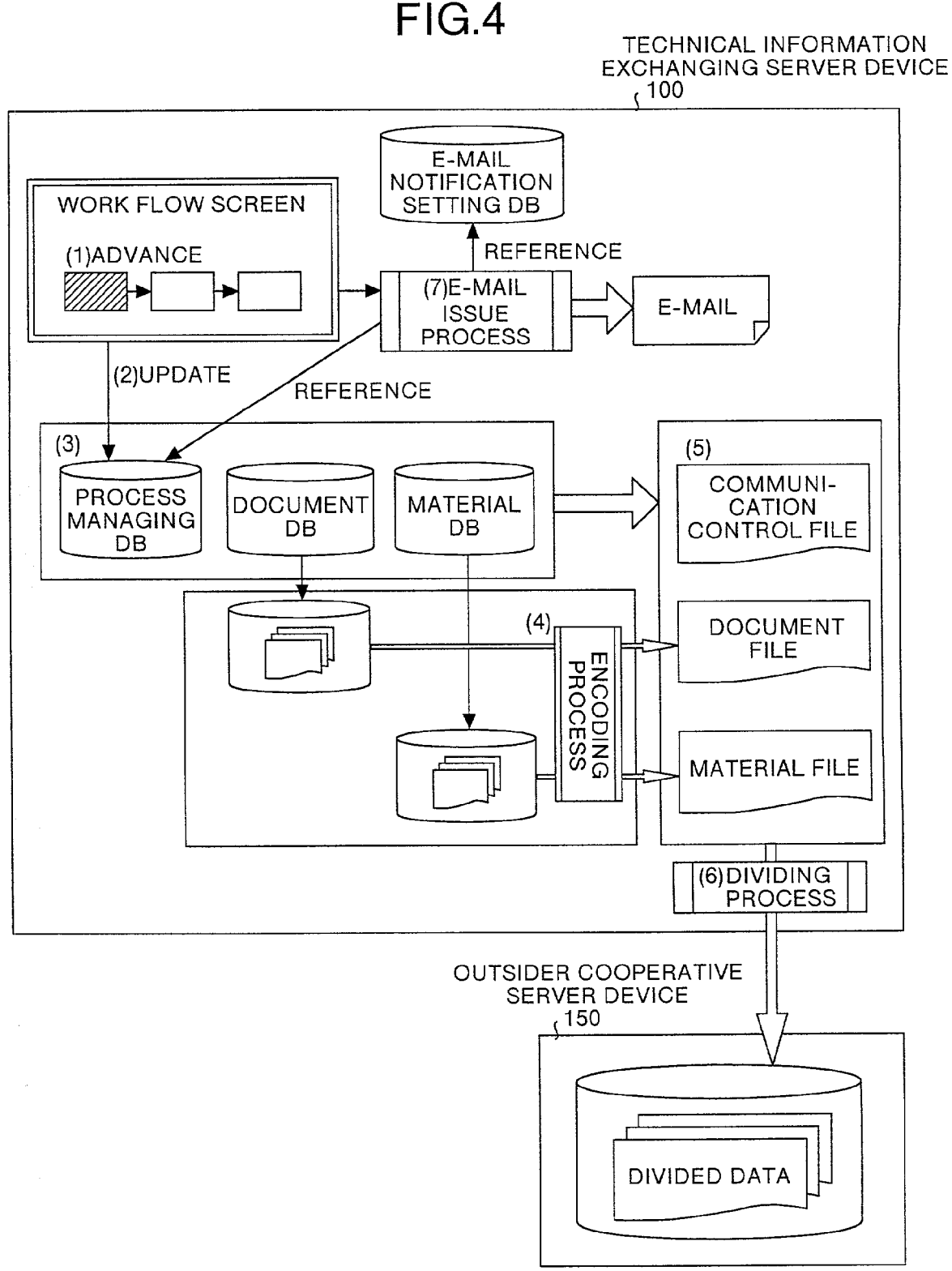
FIG. 4 is a schematic diagram that shows a process of a technical information exchanging server device 100 in the case when a stage of a business process is entrusted to an outside agent.

FIG. 4 is a schematic diagram that shows a process in the technical information exchanging server device 100 in the case when a stage of the business process is entrusted to an outside company. In the case when an outside agent-use client device 250 which cannot refer to the respective data bases to be stored in the technical information exchanging server device 100 is allowed to execute the stage, the technical information exchanging server device 100 collects various DBs and files related to the process to be executed in the stage, and transmits these to the outsider cooperative server device 150.

First, the technical information exchanging server device 100 advances the work flow that is managed by the process managing DB ((1) in FIG. 4) so that it updates the date of completion of the job, etc., in the process managing DB ((2) in FIG. 4); then, referring to various DBs (for example, the process managing DB, document DB, material DB) that are required in the next stage to be executed by the agent-use client device 250, it extracts information required for the next stage to generate a communication control information file ((3) in FIG. 4).

Next, the technical information exchanging server device 100 refers to the document DB and the material DB to extract the documents and materials related to the next stage, and accesses the bulk data file storing the corresponding documents and materials to obtain these.

Next, the technical information exchanging server device 100 encodes the acquired data of documents and materials by using the coding key of the custom-use client device 250 that forms the receiving end ((4) in FIG. 4). In this case, the encoding process may be carried out by using a known encoding technique of a published key system or encoding technique of a secret key system.

Then, the technical information exchanging server device 100 archives the generated communication control information file, and files of the encoded documents and materials into one file ((5) in FIG. 4).

Next, the technical information exchanging server device 100 divides the archive file thus generated into division files having a fixed length or a variable length, and transmits these to the outsider cooperative server device 150 ((6) in FIG. 4).

Next, referring to an electronic mail notification setting DB, the technical information exchanging server device 100 acquires the electronic mail address of the user of the agent-use client device 250 that is the receiving end, and an electronic mail is transmitted to the user, thereby informing that the archive file has been stored in the outsider cooperative server device 150 ((7) in FIG. 4).

Figure 5:
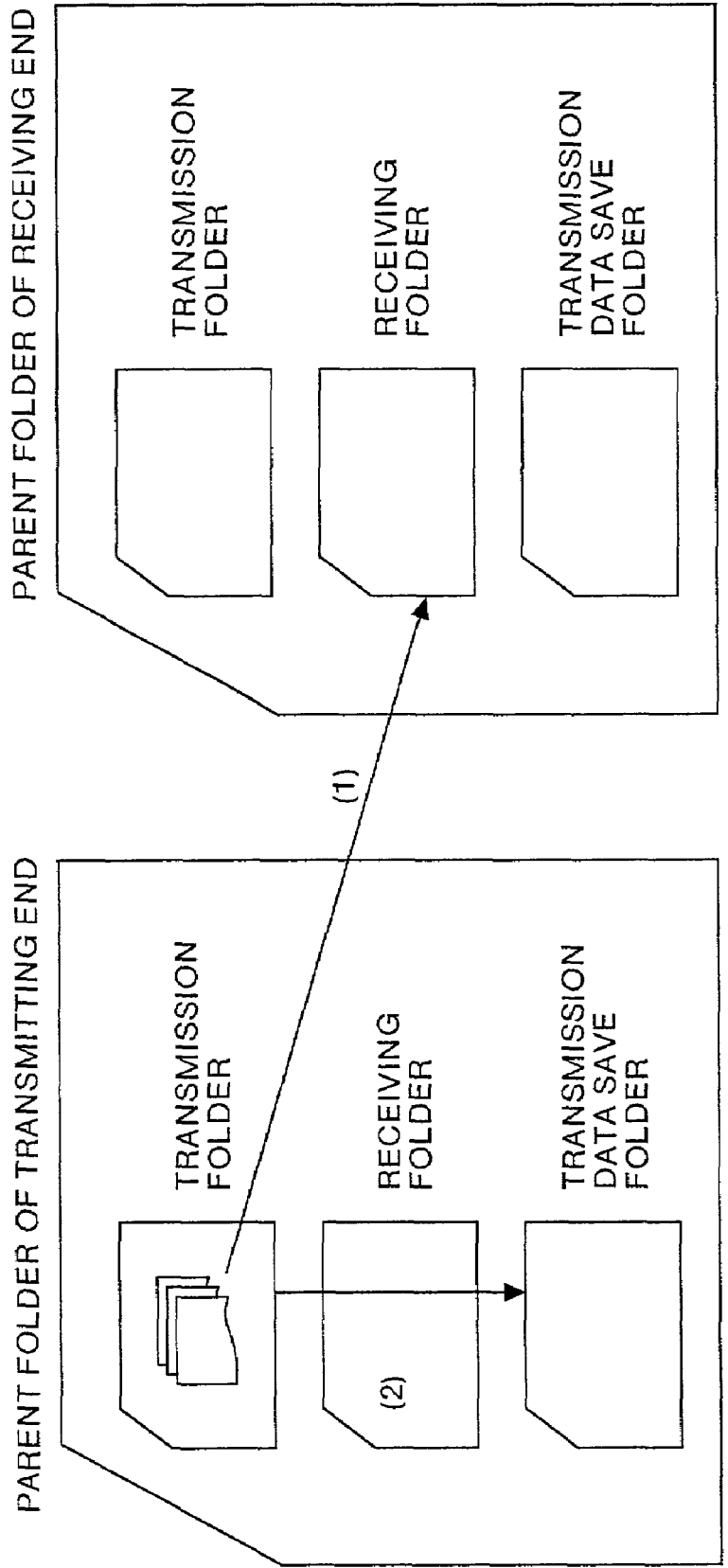
FIG. 5 is a schematic diagram that shows a mail allocating process that is executed in an outsider cooperative server device 150.

FIG. 5 is a schematic diagram that shows an allocating process of mails executed by the outsider cooperative server device 150. The outsider cooperative server device 150 refers to the transmission folders of the respective in-office use client devices 200 inside the company and the transmission folders of the respective outside agent-use client devices 200, and if there are any transmission files, it shifts these to the receiving folder of the receiving end.

First, the outsider cooperative server device 150 sets a predetermined timer based upon the time supplied from the system clock so that each time the timer is up, it retrieves the transmission folders, and if there are any transmission files, copies the transmission files into the receiving folder of the receiving end ((1) in FIG. 5).

Next, the technical information exchanging server device 100 shifts the files in the transmission folders of the transmitting end to a transmission data save folder as a backup for re-transmission process ((2) in FIG. 5). Thus, the mail allocating process executed in the outsider cooperative server device 150 has been completed.

Figure 6:
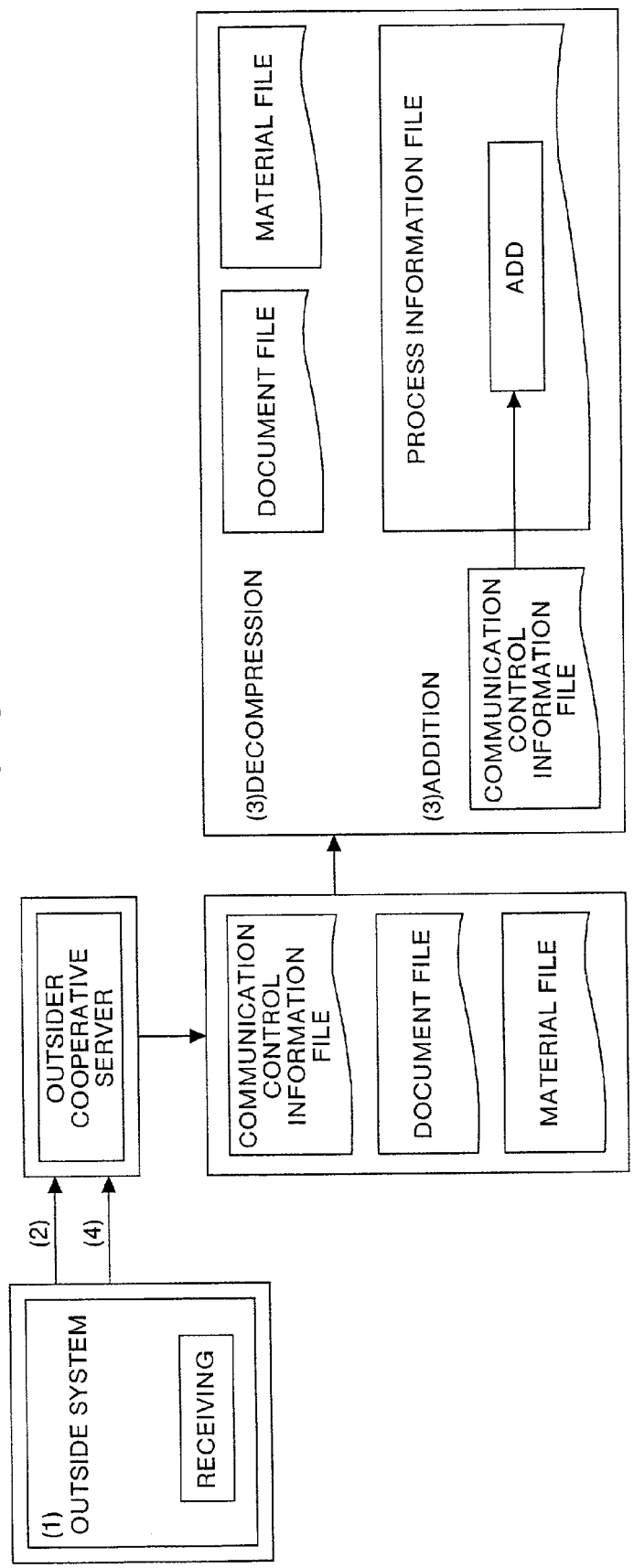
FIG. 6 is a schematic diagram that shows a file receiving process from the outsider cooperative server device 150 that is executed in an agent-use client device 250.

FIG. 6 is a schematic diagram that shows the file receiving process from the outsider cooperative server 150 that is executed by the agent-use client device 250.

First, upon receipt of the notification by the electronic mail transmitted from the technical information exchanging server device 100, the user of the agent-use client device 250 activates the outside system ((1) in FIG. 6).

Then, in the outside system of the agent-use client device 250, when the user specifies the receiving operation, a dial-up connection or an Internet connection is made to the outsider cooperative server device 150. Thus, the outside system of the agent-use client device 250 inputs a password, etc., in the receiving folder of the outsider cooperative server device 150 so as to access it, and acquires the files ((2) in FIG. 6). If the receiving process fails to acquire any files, the receiving process for only the data that it has failed to acquire is automatically executed.

Upon completion of the receiving process, the agent-use client device 250 additionally writes the information of the communication control information file thus received in a process information file, and after having been decompressed the document data and material data, decodes these by using a decoding key stored in the storage section of the agent-use client device 250, and stores these in folders that are associated with the process ((3) in FIG. 6).

Then, the outside system of the agent-use client device 250 generates a file informing that the receiving process has been completed properly, and transmits this to the outsider cooperative server device 150 ((4) in FIG. 6). Thus, the file receiving process from the outsider cooperative server device 150, executed by the agent-use client device 250, is completed.

Next, referring to a flow chart of FIG. 10, an explanation will be given of the process of each stage in the business process executed by the user of the agent-use client device 250.

First, upon receipt of the flow advance notification mail as described above, the department related to the user of the agent-use client device 250 receives the corresponding work flow information from the outsider cooperative server device 150 (step SC-1).

Next, after confirming the cut-sheets, documents, invoices, etc., of the received work flow information, if there is not any problem, it electronically puts a receipt stamp on each of these, and sends these to the outsider cooperative server device 150. If there is any problem, the received work flow information is returned to the requesting end, thereby completing the process (step SC-2) Next, in accordance with the process of each stage of the business process of which the user is in charge, the user forms documents, materials, etc., and forms an answering sheet, and transmits these to the outsider cooperative server device 150 (step SC-3). Thus, the process of each stage of the business process, executed by the user of the agent-use client device 250, has been completed.

The embodiment of the present invention is not limited only to the one explained above. The invention may be carried out in various different embodiments within the scope of the technical idea disclosed in the claims.

Moreover, among the respective processes described in the embodiment, one part or all the parts of those processes described as those being automatically executed may be manually executed, or one part or all the parts of those processes described as those being manually executed may be automatically executed using known methods.

In addition, with respect to the process sequences, control sequences, specific names, information including parameters such as various registered data and retrieving conditions, examples of screens and data base structures that have been indicated by the above-mentioned specification and drawings, desired modifications may be made, unless otherwise indicated.

Moreover, with respect to the technical information exchanging server device 100 or the outsider cooperative server device 150, those constituent elements in the drawings are conceptually given based upon their functions; therefore, they are not necessarily designed physically in the same manner as indicated by the drawings.

For example, with respect to those processing functions of each server of the technical information exchanging server device 100 and the outsider cooperative server device 150, in particular, those carried out by the control unit, one desired portion or all the portions thereof may be executed by a CPU (Central Processing Unit) and programs interpreted and executed by the CPU, or may be realized as hardware using wired logics. These programs are recorded in the present recording medium, not shown, and mechanically read by the technical information exchanging server device 100 or the outsider cooperative server device 150, if necessary.

Moreover, the technical information exchanging server device 100 or the outsider cooperative server device 150 may be provided with an input device (not shown) constituted by various pointing devices such as a mouse, a keyboard, an image scanner, a digitizer, etc., a display device (not shown) used as a monitor for input data, and an output device (not shown) such as a printer for outputting the results of various processes and other data, as additional constituent elements; and these input device, display device and output device may be respectively connected to the control unit through the input-output interface.

Moreover, various databases, installed in the storage section, are storage means such as a memory device like a RAM, a ROM, etc., a fixed disk device like a hard disk, a flexible disk and an optical disk, and these are used for storing various programs, tables, files, data bases, web-page-use files and other data, that are used for various processes and for Web-site supplies.

Furthermore, the technical information exchanging server device 100 or the outsider cooperative server device 150 may be realized by connecting peripheral devices such as a printer, a monitor and an image scanner to a known information processing device such as an information processing terminal like a personal computer, a work station, etc., and installing software (including programs, data, etc.) for realizing the method of the present invention in such a information processing device.

The specific state of the distribution and unification of the technical information exchanging server device 100 or the outsider cooperative server device 150 is not limited to the state indicated by the Figures; and one portion or all the portions thereof may be functionally or physically distributed or unified based upon a desired unit determined depending on various loads, etc. For example, each data base may be independently provided as an independent data base device, and one portion of the processes maybe realized by using CGI (Common Gateway Interface).

The in-office use client device 200 or the agent-use client device 250 may be realized by connecting peripheral devices such as a printer, a monitor and an image scanner to a known information processing device such as an information processing terminal like a personal computer, a work station, a home-use game device, an Internet TV, a PHS terminal, a portable terminal, a mobile communication terminal or a PDA, on demand, and installing software (including programs, data, etc.) for realizing a browsing function for Web information and an electronic mail function in such an information processing device.

With respect to the control unit of the in-office use client device 200 or the agent-use client device 250, one desired portion or all the portions thereof may be realized by a CPU and programs that are interpreted and executed by the CPU. In other words, computer programs, which give commands to the CPU in cooperation with an OS (Operating System) to carry out various processes, are recorded in the ROM or HD. These computer programs, which are loaded by the RAM so as to be executed, constitute a control unit in cooperation with the CPU.

These computer programs may be recorded in an application program server that is connected to the in-office use client device 200 or the agent-use client device 250 through a predetermined network, and one portion or all the portions thereof may be downloaded, on demand. Alternatively, desired one portion or all the portions of each control section may be realized as hardware such as wired logics.

Moreover, the "computer-readable recording medium" includes a desired "portable, physical medium", such as a floppy disk, a magneto-optical disk, a ROM, an EPROM, an EEPROM, a CD-ROM, an MO and a DVD, and a desired "fixed physical medium", such as a ROM a RAM and an HO installed in various computer systems. The system includes a "communication medium" temporarily holding programs, such as a communication line and carrier waves, in the case of transmitting such programs through a network typically represented by a LAN, a WAN and the Internet.

Moreover, the "program" refers to a data processing method described in a desired language and a description method, and any format, such as source codes and binary codes, may be used. The term "program" is not necessarily limited to a singly constituted one, and includes those constituted in a scattered manner as a plurality of modules and libraries and those that achieve the corresponding functions in cooperation with another program typically represented by an OS (Operating System). Additionally, in the respective devices shown in the embodiment, with respect to specific structures for reading the recording media, reading sequences, or installing sequences after the reading operations, etc., known structures and sequences may be used.

Moreover, the network 300, which has functions for mutually connecting the technical information exchanging server device 100 or the outsider cooperative server device 150 to the in-office use client devices 200 or the agent-use client devices 250, may include, for example, any of the following systems: the Internet, the Intranet, the LAN (including cable/radio systems), the VAN, a personal computer network, a public telephone network (including analog/digital systems), a dedicated cable network (including analog/digital systems), a CATV network, an IMT in-office use client device 200 or agent-use client device 2500 system, a portable line exchange network/portable packet exchange network, such as a GSM system or a PDC/PDC-P system, a radio calling network, a local radio network such as Bluetooth, etc., a PHS network, and a satellite communication network such as CS, BS or ISDB. In other words, not limited to cables or radio, the present system may transmit and receive various data through any desired network.

As described above, in accordance with the present invention, since the server device stores the managing number corresponding to each of the business processes, it is possible to totally manage the managing numbers so that billing documents, materials, etc., generated in the business processes are made in association with each other through the managing numbers.

Moreover, since the server device stores the process information for managing the work flow corresponding to each business process having the stored managing number, it is possible to manage the business process in association with the managing number. Furthermore, since the information related to the work flow is shared between departments/companies, it is possible to easily confirm which department or job has a delay, and consequently to reduce a delay in work. Moreover, since it is possible to easily confirm the state of work even in the ordered company, it becomes possible to reduce a delay in work. Furthermore, since the ordered company is allowed to preliminarily confirm the ordering information, it is possible to shorten the business procedure.

Since the server stores technical information generated in each of the stages constituting the work flow, it is possible to manage the technical information such as documents and materials in a manner so as to be set with the managing number; thus, another user is allowed to easily refer to the technical information. Moreover, at the time when the technical information related to the work flow is stored, it is possible to easily manage the number of issues of the technical information. Furthermore, from the viewpoint of security, with respect to each piece of technical information, managing is easily made as to whether it is set as information inherent to the stage at which it is formed or set as information to be shared with other stages.

Moreover, since the server device transmits the process information and the technical information to the outsider cooperative server device, the user outside the company is allowed to refer to the process information and the technical information as one set. Furthermore, the user outside is allowed to receive the necessary information at one time, it is possible to reduce a delay in work.

The outsider cooperative server device stores the process information and the technical information received from the server device in the transmission folder for the server device, stores the transmission folder thus stored in a receiving folder for the client device in each department outside the company, and permits the client device in each department outside the company to access the receiving folder in accordance with predetermined conditions; therefore, the outsider cooperative server device makes it possible to transmit the technical information, etc., safely by its own function without giving any effects on the existing system. Moreover, in the customer side, a plurality of users (departments) are allowed to use the information, etc., so that the data is easily shared within the customer side.

The server device compresses the technical information, divides the compressed technical information, and transmits the divided technical information to the outsider cooperative server device. Thus the system automatically compresses data having a great capacity, and transmits the data in a divided state. Therefore, it is possible to easily transmit and receive data having a great capacity. In other words, since the technical information such as documents and materials requiring a great capacity is automatically compressed within the system, it becomes possible to reduce unnecessary jobs such a compressing job imposed on the user.

Furthermore, the server device carries out an electronic stamping process on the technical information, and the work flow is executed after the stamping process has been completed. Therefore, it is possible to readily carry out approving processes on various documents, such as ordering cut-sheets and answering cut-sheets, and consequently to accelerate the execution of the work flow. Moreover, the approver for transmission, etc., is allowed to readily refer to the technical information other than cut-sheets/documents; thus, it becomes possible to positively maintain evidence. Furthermore, when the upper-rank stamping process has been finished, the necessity of any of the lower-rank stamping processes can be eliminated, thereby making it possible to improve the operability.

Furthermore, the server device stores a template work flow corresponding to the business process so that the user only needs to select the corresponding department and work, etc., from a list of the templates so as to form the work flow, thereby making it possible to eliminate the necessity of technical knowledge in forming the work flow.

Furthermore, the server device is allowed to alter the stored template work flow. Therefore, for example, returning of jobs (discarding), skipping of jobs (jumping), etc., can be added to the work flow, thereby making it possible to handle any work flow for any kind of business processes. Moreover, the work flow can be set so that a plurality of jobs are branched from a predetermined job so as to be processed in parallel with each other. Therefore, it is possible to handle any work flow for any kind of business processes. Furthermore, it is possible to set the schedule independently by altering the deadline, etc., of the template work flow, and consequently to set the deadline, etc., in a definite manner. By setting the deadline, etc., finely on the basis of each job in each stage of the work flow, it becomes possible to carry out the deadline management in a more precise manner.

Furthermore, the server device is allowed to encode the technical information by using a coding key received from each of client devices of respective departments outside the company, and transmits the coded technical information to the outsider cooperative server device. Thus, the system automatically carries out the encoding process and the succeeding transmitting process, and on the receiving side, the system automatically carries out the decoding process, thereby making it possible to ensure security.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A business process managing system comprising:
    a server device connected to a plurality of client devices through a network, said client devices being installed at different departments inside a company; and
    an outsider cooperative server connected to a plurality of client devices through a network, said client devices being installed at different departments outside said company,
    said server device and outsider cooperative server being connected to each other through a network, wherein said server device having, a managing number storage unit which stores a managing number corresponding to the business process;

a process information storage unit which stores process information for managing a work flow corresponding to the business process having the managing number stored in said managing number storage unit;

a technical information storage unit which stores technical information formed in any of stages constituting the work flow; and a transmission unit which transmits the process information stored in said process information storage unit and the technical information stored in said technical information storage unit to said outsider cooperative server device, said outsider cooperative server device having, a transmission folder storage unit which stores the process information and the technical information received from said server device in a transmission folder for said server device;

a receiving folder storage unit which stores the transmission folder stored by the transmission folder storage unit in a receiving folder for each of the client devices of the respective departments outside the company; and an access permission unit which gives a permission to said client devices for the respective departments outside the company to make an access to the receiving folder in accordance with respective conditions.

2. The business process managing system according to claim 1, wherein said server device further comprises:
an electronic stamping unit which carries out an electronic stamping process on the technical information; and
a work flow advancing unit which advances the work flow after the stamping process has been completed.

3. The business process managing system according to claim 1, wherein said server device further comprises:
a template work flow storage unit which stores a template work flow corresponding the business process.

4. The business process managing system according to claim 3, wherein said server device further comprises:
a work flow alteration unit which alters the template work flow stored in the template work flow storage unit.

5. The business process managing system according to claim 1, wherein said server device further comprises:
a coding unit which codes the technical information by using a coding key received from each of client devices of respective departments outside the company, wherein
said transmission unit transmits the technical information coded by said coding unit to said outsider cooperative server device.

6. The business process managing system according to claim 1, wherein said server device further comprises:
a compressing unit which compresses the technical information; and
a dividing unit which divides the technical information compressed by said compressing unit, wherein
said transmission unit transmits the technical information divided by the dividing unit to said outsider cooperative server device.

7. A server device, which is used in a business process managing system having said server device connected to client devices of respective departments inside a company through a network and an outsider cooperative server connected to client devices of respective departments outside the company through a network, said server device and the outsider cooperative server being connected to each other so as to communicate with each other, said server device comprising:

a managing number storage unit which stores a managing number corresponding to the business process;

a process information storage unit which stores process information for managing a work flow corresponding to the business process having the managing number stored in said managing number storage unit;

a technical information storage unit which stores technical information formed in any of stages constituting the work flow;

a transmission unit which transmits the process information stored in said process information storage unit and the technical information stored in said technical information storage unit to said outsider cooperative server device; and a coding unit which codes the technical information by using a coding key received from each of client devices of respective departments outside the company, wherein said transmission unit transmits the technical information coded by said coding unit to said outsider cooperative server device.

8. A server device, which is used in a business process managing system having said server device connected to client devices of respective departments inside a company through a network and an outsider cooperative server connected to client devices of respective departments outside the company through a network, said server device and the outsider cooperative server being connected to each other so as to communicate with each other, said server device comprising:

a managing number storage unit which stores a managing number corresponding to the business process;

a process information storage unit which stores process information for managing a work flow corresponding to the business process having the managing number stored in said managing number storage unit;

a technical information storage unit which stores technical information formed in any of stages constituting the work flow;

a transmission unit which transmits the process information stored in said process information storage unit and the technical information stored in said technical information storage unit to said outsider cooperative server device;

a compressing unit which compresses the technical information; and a dividing unit which divides the technical information compressed by said compressing unit, wherein said transmission unit transmits the technical information divided by said dividing unit to said outsider cooperative server device.

9. A business process managing method, which uses a business process managing system comprising a server device connected to client devices of respective departments inside a company through a network and an outsider cooperative server connected to client devices of respective departments outside the company through a network, the server device and the outsider cooperative server being connected to each other so as to communicate with each other, the method comprising the steps of:

storing a managing number corresponding to the business process;

storing process information for managing a work flow corresponding to the business process having the stored managing number;

storing technical information formed in any of stages constituting the work flow;

transmitting the stored process information and technical information to said outsider cooperative server device;

storing the process information and the technical information received from said server device in a transmission folder for said server device;

storing the transmission folder in a receiving folder for each of the client devices of the respective departments outside the company; and giving a permission to said client devices for the respective departments outside the company to make an access to the receiving folder in accordance with respective conditions.

10. The business process managing method according to claim 9, further comprising the steps of:

carrying out an electronic stamping process on the technical information; and advancing the work flow after the stamping process has been completed.

11. The business process managing method according to claim 9, further comprising the step of:

storing a template work flow corresponding the business process.

12. The business process managing method according to claim 11, further comprising the step of:

altering the stored template work flow.

13. The business process managing method according to claim 9, further comprising the step of:

coding the technical information by using a coding key received from each of client devices of respective departments outside the company, wherein the coded technical information is transmitted to said outsider cooperative server device in the transmission step.

14. The business process managing method according to claim 9, further comprising the steps of:

compressing the technical information; and dividing the compressed technical information, wherein the divided and compressed technical information is transmitted to said outsider cooperative server device in the transmission step.

15. A computer-readable recording medium storing a first program and a second program, wherein said first program allows a server device to execute a business process managing method, said server device being used in a business process managing system having said server device connected to client devices of respective departments inside a company through a network and an outsider cooperative server connected to client devices of respective departments outside the company through a network, said server device and the outsider cooperative server being connected to each other so as to communicate with each other, the first program making a computer realize the steps of:

storing a managing number corresponding to the business process;

storing process information for managing a work flow corresponding to the business process having the stored managing number;

storing technical information formed in any of stages constituting the work flow; and transmitting the stored process information and technical information to said outsider cooperative server device; and wherein said second program allows an outsider cooperative server device to execute a business process managing method, said outsider cooperative server device being used in a business process managing system having a server device connected to client devices of respective departments inside a company through a network and said outsider cooperative server connected to client devices of respective departments outside the company through a network, the server device and said outsider cooperative server being connected to each other so as to communicate with each other, said second program making the computer realize the steps of:

receiving process information for managing a work flow corresponding to the business process and technical information formed in any of stages constituting the work flow from said server device;

storing the process information the technical information received from said server device in a transmission folder for said server device;

storing the transmission folder in a receiving folder for each of the client devices of the respective departments outside the company; and giving permission to said client devices for the respective departments outside the company to make an access to the receiving folder in accordance with respective conditions.

16. The computer-readable recording medium storing the first program according to claim 15, said first program further making the computer realize the step of:

carrying out an electronic stamping process on the technical information; and advancing the work flow after the stamping process has been completed.

17. The computer-readable recording medium storing the first program according to claim 15, said first program further making the computer realize the step of:

storing a template work flow corresponding the business process.

18. The computer-readable recording medium storing the first program according to claim 17, said first program further making the computer realize the step of:

altering the stored template work flow.

19. The computer-readable recording medium storing the first program and the second program according to claim 15, the first program further making the computer realize the steps of:

storing a managing number corresponding to the business process;

storing process information for managing a work flow corresponding to the business process having the stored managing number;

storing technical information formed in any of stages constituting the work flow;

transmitting the stored process information and technical information to said outsider cooperative server device; and coding the technical information by using a coding key received from each of client devices of respective departments outside the company, wherein the coded technical information is transmitted to said outsider cooperative server device in the transmission step.

20. The computer-readable recording medium storing the first program and the second program according to claim 15, the first program further making the computer realize the steps of:

storing a managing number corresponding to the business process;

storing process information for managing a work flow corresponding to the business process having the stored managing number;

storing technical information formed in any of stages constituting the work flow;

transmitting the stored process information and technical information to said outsider cooperative server device;

compressing the technical information; and dividing the compressed technical information, wherein the divided and compressed technical information is transmitted to said outsider cooperative server device in the transmission step.

* * * * *

UNITED STATES PATENT AND TRADEMARK OFFICE
CERTIFICATE OF CORRECTION

| | | |
|---|---|---|
| PATENT NO. | : 7,493,379 B2 | Page 1 of 1 |
| APPLICATION NO. | : 09/881737 | |
| DATED | : February 17, 2009 | |
| INVENTOR(S) | : Osamu Takizawa et al. | |

It is certified that error appears in the above-identified patent and that said Letters Patent is hereby corrected as shown below:

Column 17, Line 37, after "corresponding" insert --to--.

Column 19, Line 19, after "corresponding" insert --to--.

Column 20, Line 32, after "corresponding" insert --to--.

Signed and Sealed this

Second Day of June, 2009

JOHN DOLL
*Acting Director of the United States Patent and Trademark Office*